(12) United States Patent
Miyawaki et al.

(10) Patent No.: US 7,949,882 B2
(45) Date of Patent: May 24, 2011

(54) STORAGE SESSION MANAGEMENT SYSTEM IN STORAGE AREA NETWORK

(75) Inventors: Toui Miyawaki, Kawasaki (JP); Emiko Kobayashi, Yokohama (JP); Takeshi Ishizaki, Yokohama (JP); Shigeru Miyake, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1409 days.

(21) Appl. No.: 11/179,748

(22) Filed: Jul. 13, 2005

(65) Prior Publication Data

US 2006/0212719 A1 Sep. 21, 2006

(30) Foreign Application Priority Data

Mar. 16, 2005 (JP) ................................. 2005-074587

(51) Int. Cl.
G06F 11/30 (2006.01)
G06F 21/00 (2006.01)
(52) U.S. Cl. ........................... 713/189; 713/188; 705/50
(58) Field of Classification Search .......... 713/187–189; 711/112, 133, 136, 163; 709/217, 218, 219, 709/229, 230, 246; 370/401, 466
See application file for complete search history.

(56) References Cited

U.S. PATENT DOCUMENTS

| 6,484,187 B1 * | 11/2002 | Kern et al. ..................... 707/204 |
| 2003/0088683 A1 | 5/2003 | Kitamura et al. |
| 2004/0030757 A1 * | 2/2004 | Pandya .......................... 709/217 |
| 2004/0030837 A1 * | 2/2004 | Geiner et al. ................. 711/133 |
| 2004/0153753 A1 | 8/2004 | Yamaguchi et al. |
| 2004/0264481 A1 * | 12/2004 | Darling et al. ................ 370/401 |
| 2005/0015685 A1 | 1/2005 | Yamamoto |
| 2006/0253549 A1 | 11/2006 | Arakawa et al. |

FOREIGN PATENT DOCUMENTS

| JP | 02-081123 | 3/1990 |
| JP | 10-003396 | 1/1998 |
| JP | 2002-351755 | 12/2002 |
| JP | 2003-316522 | 11/2003 |
| JP | 2004-164046 | 6/2004 |
| JP | 2005-25483 | 1/2005 |
| JP | 2005-051413 | 2/2005 |

OTHER PUBLICATIONS

Translation of relevant portions of the Office Action in JP 2005-074587, May 11, 2010 [2 pgs.].

* cited by examiner

*Primary Examiner* — Kimyen Vu
*Assistant Examiner* — Suman Debnath
(74) *Attorney, Agent, or Firm* — Antonelli, Terry, Stout & Kraus, LLP.

(57) ABSTRACT

In a storage session management system in a storage area network, the session information blocks periodically collected from the storage devices in the network are grouped based on the information indicating the relation between sessions. That is, since a storage session management server in the management system integrally manages constitution information and operation information, when there is a possibility that circumstances such as a failure and the deterioration of performance occur in information devices, a failure notification module displays such circumstances and makes notification of them to a minimum necessary range that is consolidated by a session consolidation module, thereby a storage session can be managed without applying loads on the respective information devices and the network.

8 Claims, 7 Drawing Sheets

FIG.4

| DEVICE ID | TYPE OF STATUS | | | | OPERATION STATUS |
|---|---|---|---|---|---|
| | CPU | MEMORY | PORT | .... | |
| 110 | NORMAL | NORMAL | NORMAL | .... | NORMAL |
| 120 | NORMAL | NORMAL | NORMAL | .... | NORMAL |
| 130 | NORMAL | NORMAL | NORMAL | .... | NORMAL |
| 150 | NORMAL | NORMAL | FAILURE | .... | FAILURE |
| .... | .... | .... | .... | .... | .... |

FIG.5

| iSCSI SESSION ID | INITIATOR | TARGET | DISC | PORT | COLLECTION TIME | ACTIVE |
|---|---|---|---|---|---|---|
| session1 | i1 | t1 | 132 | P1:P3 | T1 | 1 |
| session2 | i3 | t3 | 142 | P4:P5 | T1 | 1 |
| session3 | i2 | t2 | 133 | P2:P3 | T2 | 0 |
| session4 | i3 | t3 | 142 | P4:P5 | T2 | 0 |
| .... | .... | .... | .... | .... | .... | .... |

FIG.6

| COPY SOURCE INFORMATION | | | | COPY DESTINATION INFORMATION | | | |
|---|---|---|---|---|---|---|---|
| DEVICE ID | IP ADDRESS | DISC No. | PORT | DEVICE ID | IP ADDRESS | DISC No. | PORT |
| 130 | a.b.c.1 | 132 | P4 | 140 | a.b.c.2 | 142 | P5 |
| 130 | a.b.c.1 | 133 | P4 | 140 | a.b.c.3 | 143 | P5 |
| .... | .... | .... | .... | .... | .... | .... | .... |

FIG.7

| PATH | PORT |
|---|---|
| 1 | P1, P6, P7, P3 |
| 2 | P4, Pn, Pm, P5 |
| 3 | P2, P6, P7, P3 |
| .... | .... |

FIG.8

| SERVICE | USER ACCESS | REMOTE COPY |
|---|---|---|
| AP1 | session1 | session2 |
| AP2 | session3 | session4 |
| .... | .... | .... |

FIG.10

| TARGET | iSCSI SESSION ID | FAILURE-OCCURRING LOCATION | FAILURE-OCCURRING TIME | CONTENTS OF FAILURE |
|---|---|---|---|---|
| t1 | session1 | SECONDARY STORAGE DEVICE 140 | YYYY/MM/DD/ hh:mm:ss | FAILURE OCCURRING IN DISC 142 |
| t3 | session2 | .... | .... | .... |
| .... | .... | .... | .... | .... |

STORAGE SESSION MANAGEMENT SYSTEM IN STORAGE AREA NETWORK

The present application is based on and claims priority of Japanese patent application No. 2005-074587 filed on Mar. 16, 2005, the entire contents of which are hereby incorporated by reference.

BACKGROUND

The present invention relates to a storage session management system in a storage area network (hereinafter, abbreviated as "SAN") using Internet Protocol (hereinafter, abbreviated as "IP"). In the following description, SAN using IP is shown as IP-SAN.

A conventional technology for storage access is a fibre channel (hereinafter, abbreviated as "FC") using a serial transfer system. In the following description, SAN using FC is shown as FC-SAN. In FC-SAN, when a failure occurs in a storage device, there is no serious problem even if a failure notification is issued to all the servers statically connected to the storage device. This is because that the failure notification is inherently limited to a particular range because a large scale network cannot be constructed due to the technical restriction of FC-SAN and that when a physical connection is established in FC-SAN, a logical connection is also established in general, there is no concept of a dynamically changing storage session.

However, when IP-SAN based on Internet SCIS (Internet small computer system interface, hereinafter, abbreviated as "iSCSI") as shown in non-patent document 1 is used as a technology for storage access, even if there is a static connection, a dynamically changing storage session (hereinafter, abbreviated as "iSCSI session") is not always established. Accordingly, when a failure occurs in, for example, a storage device, a problem arises in that a failure notification is issued to all the servers statically connected to the storage device. As a result, there is a possibility that since IP-SAN is excellent in network extensibility, the failure notification is issued to a very wide range and that, in the failure notification method, the failure notification is also sent to the servers which do not access to the failed storage device and thus are not affected by the failure. Therefore, a problem arises in that the failure notification places an excessive load on SAN or a burden is increased on the servers which receive the failure notification.

Next, a conventionally arranged management system in IP-SAN will be shown below.

[Patent document 1] U.S. Patent Application Publication No. 20030088683

[Non-patent document 1] RFC3720 Internet Small Computer Systems Interface (iSCSI).

As described in Description of the Related Art, when the failure notification method of conventional FC-SAN is used as it is in IP-SAN, a load on the network and the users is increased. Accordingly, to notify a failure without problems in IP-SAN, an iSCSI session management system is necessary to simultaneously manage static connection information and iSCSI session information that is dynamic connection information. Further, the iSCSI session management system is generally required to be less burdensome to a manager, the network, and the users.

SUMMARY

Accordingly, an object of the present invention is to provide a storage session management system that can reduce loads on a manager, a network, and users and a management cost by managing iSCSI session information over an entire IP-SAN area having a scale-increasing factor based on not only the static connection information periodically obtained from the network devices and servers in IP-SAN but also the iSCSI session information periodically collected from the storage devices in IP-SAN and the information showing the relation between iSCSI sessions to thereby make it possible to restrict the range of a failure notification.

To solve the above objects, in a storage session management system in a storage area network according to the present invention in which information devices such as one or more servers, one or more storage devices, and one or more rooters are connected to each other through the network, the management system includes a storage session management server for integrally managing the constitutional information and the operation information of the information devices.

According to the storage area network of the present invention, since the storage session management server for integrally managing the constitution information and the operation information is provided, when there is a possibility that circumstances such as a failure and the deterioration of performance occur in information devices, such circumstances are displayed and notified to a minimum necessary range, thereby a storage session can be managed without applying loads on the respective information devices and on the network. Grouping of iSCSI session information is exemplified as a mode of integral management, and the notification of the failure is limited only to the group, thereby it is possible to reduce the loads on a manager, the network, and users.

In the storage session management system, the storage session management server may manage the constitution information, which is dynamic and can change in the storage area network as a time passes, or the constitution information that is static and does not change in the storage area network as a time passes. The storage session management server not only manages the static constitution information which does not change in the storage area network as a time passes but also manages the dynamic constitution information which may change as a time passes. Accordingly, the range to which the circumstances of failure and the deterioration of performance are displayed and notified can be limited to a minimum necessary range, thereby a load on the system can be reduced.

In the storage session management system in which the storage session management server manages the dynamic or static constitution information in the storage area network, the dynamic constitution information in the storage area network may be the information of the sessions stored in an MIB data format and the internal connection information held by the disc managers included in the storage devices, and the storage session management server may consolidate and manage the session information based on the dynamic constitution information. Since the session information is managed based on the information of the sessions stored in the MIB data format and on the internal connection information held by the disc managers, the session information that changes from time to time can be consolidated and managed.

In the storage session management system in which the storage session management server manages the dynamic or static constitution information in the storage area network, the logic/physical correspondence relation may be managed based on the default gateway information and the routing information included in the information devices.

In the storage session management system, the storage session management server may manage the operation information of the storage devices and the operation information of the sessions related to the storage devices. Here, the sessions relating to the storage devices includes the sessions themselves and what is indirectly related to the sessions.

In the storage session management system in which the storage session management server manages the operation information of the sessions, the storage session management server collects the operation information of the respective sessions, which is the base data of the failure information and the performance information of the storage devices, over the entire storage area network and may manage the occurrence of failure and the deterioration of performance of the information devices.

In the storage session management system for collecting and managing the operation information of each session, the failure information of the sessions may be integrated, and a degree of failure and the ratio of failure of sessions occupied in the group of the sessions may be determined, consolidated as the failure information of the overall group of the sessions, and displayed.

In the storage session management system for collecting and managing the operation information of each session, the performance information of the sessions may be integrated, and a degree of performance and the ratio of deterioration of the performance of sessions occupied in the group of the sessions may be determined, consolidated as the performance information of the overall group of the sessions, and displayed.

In the storage session management system in which the storage session management server manages the operation information of the sessions, the storage session management server may collect the operation information of the storage devices over the entire storage area network, may create the information, in which the operation information of the storage devices are narrowed down in the unit of the sessions or in the unit of the group of the sessions to which the storage devices whose performance is determined to be deteriorated based on the operation information belong, and may display the information.

In the storage session management system in which the operation information, in which the operation information of the storage devices is managed over the entire storage area network, the operation information of the sessions affected by the failure occurred in the storage devices may be specified by obtaining failure information in the unit of the sessions or in the unit of the group of the sessions to which the storage devices belong.

In the storage session management system in which the operation information, in which the operation information of the storage devices is managed over the entire storage area network, the operation information of the sessions affected by the deterioration of performance occurred in the storage devices may be specified by obtaining performance information in the unit of the sessions or in the unit of the group of the sessions to which the storage devices belong.

In the storage session management system, the storage session management server may communicate with the respective information devices of the storage area network and includes a session management unit, wherein the session management unit may include a status collection module for periodically issuing a report of the operation statuses of the respective devices regardless of presence or absence of failure, a session consolidation module for grouping and consolidating the information of the sessions created by the status collection module based on the category of each application for management, a failure detection module for receiving the failure report from the respective devices or the report of the operation statuses from the status collection module and issuing an instruction for prompting the execution of a failure notification, a failure notification module for notifying the group of the sessions of a failure, the group of the sessions being consolidated by the session consolidation module based on the output of the instruction for prompting the execution of the failure notification from the failure detection module, and a session display module for visualizing the session information consolidated by the session consolidation module together with the information as to the failure notification from the failure notification module. According to the storage session management server, the information from the respective information devices of the storage area network is transmitted to the status collection module, the session consolidation unit, and the failure detection module, the information collected by the status collection module is sent to the failure detection module, and when a failure occurs and is detected, it is sent to the failure notification module. Since the session information is grouped and consolidated in the session consolidation module, the failure is notified only to the group of sessions which is determined necessary based on the consolidated information.

In the storage session management system having the respective basic modules, the session consolidation module may reflect the policy of a manager based on the session information displayed by the session display module. That is, the manager, which has recognized the session information displayed by the session display module, can reflect, for example, the policy of notifying the failure notification to the method of consolidating the session information, thereby the manager can more preferably execute the failure notification.

In the storage session management system, the session display module may display the bone structure of the storage area network including the static logic connection and the dynamic logic connection as well as may includes a screen for displaying a constitution information display screen that displays at least the failed devices of the devices constituting the storage area network or the sessions and a manipulation panel screen for issuing a failure notification to the failed devices or to the sessions in relation to the constitution information display screen. Since the session display module displays the constitution information display screen and the manipulation panel screen, the manager can easily recognize the device in which a failure occurs and the affect of the failure by observing these screens, thereby the manager can take a proper countermeasure instantly. Note that it is preferable to display the constitution information display screen and the manipulation panel screen side by side on the same screen.

In the storage session management system in which the session display module displays the constitution information display screen and the manipulation panel screen, the constitution information display screen may entirely display or may not display at all the devices whose performance is deteriorated, the storage sessions to which the failed devices belong, or the group of the storage sessions or may display them in any one of emphasis font and non-emphasis font after the constitution information display screen narrows down them based on the performance information of the devices included in the operation information. With the above display, the range of the device in which a failure occurs and the range of the other devices affected by the deterioration of performance of the failed device are visually displayed, thereby the manager can accurately and easily recognize the presence or absence of failure and the degree of a failure when it occurs.

In the storage session management system in which the session display module displays the constitution information display screen and the manipulation panel screen may include a session display panel for selecting a session to be displayed on the constitution information display screen, a failure-affected range display panel capable of instructing to display a list of the failed devices and the failure-affected area selected from the list, a failure notification policy set panel that capable of setting a failure notification policy comprising the respective items of the name of the failed device, the name of the session, notification items, and notification destinations, and a failure notification/notification for management panel for designating a list of the sessions and notification items and instructing to notify them. Provision of the manipulation panel screen makes it possible to select a session to be displayed on the constitution information display screen by manipulating the session display panel. When the failed device exists, the range affected by the failed device can be indicated by selecting the failed device by manipulating the failure-affected range display panel. Further, the failure notification policy comprising the respective items of the name of the failed device, the name of the session, notification items, and notification destinations can be set by manipulating the failure notification policy set panel, and it is possible to designate the list of the sessions and the notification items by manipulating the failure notification/notification for management panel and to instruct to notify them.

The following advantages can be obtained by applying the present invention to IP-SAN having an increased scale. More specifically, when the iSCSI session information is consolidated and integrally managed, the portion in which an iSCSI session can be created, a portion in which the iSCSI session is created, the failure information generated in the iSCSI session, the information of the iSCSI session disappeared by the failure, and the like can be grasped, and the range affected by the failure can be narrowed down. As a result, since the failure notification can be issued only to the active sessions relating to the failure and need not to be issued to the sessions other than them, a load on the network and the affect to the user can be minimized, thereby the cost of the IP-SAN can be reduced.

BRIEF DESCRIPTION OF THE DRAWINGS

FIG. 4 shows an example of a status table;
FIG. 5 is a view showing an example of an iSCSI session table;
FIG. 6 is a view showing an example of a copy pair table;
FIG. 7 is a view showing an example of a path table;
FIG. 8 is a view showing an example of a service group table;
FIG. 10 is a view showing an example of a failure notification table.

DESCRIPTION OF THE PREFERRED EMBODIMENTS

IP-SAN, in which one or more business operation servers, one or more storage devices, and one or more iSCSI session management servers are connected to each other through an IP network having one or more routers, will be explained in detail below with reference to the drawings.

Embodiment 1

An example of an iSCSI session management system will be explained as an embodiment of the present invention. In the IP-SAN, when a remote copy is realized between a primary storage device installed in a local site and a secondary storage device installed in a remote site, the iSCSI session management system notifies a failure occurred in IP-SAN to the business operation servers which are actually affected by the failure by automatically narrowing down the range to be notified.

Figure 1:
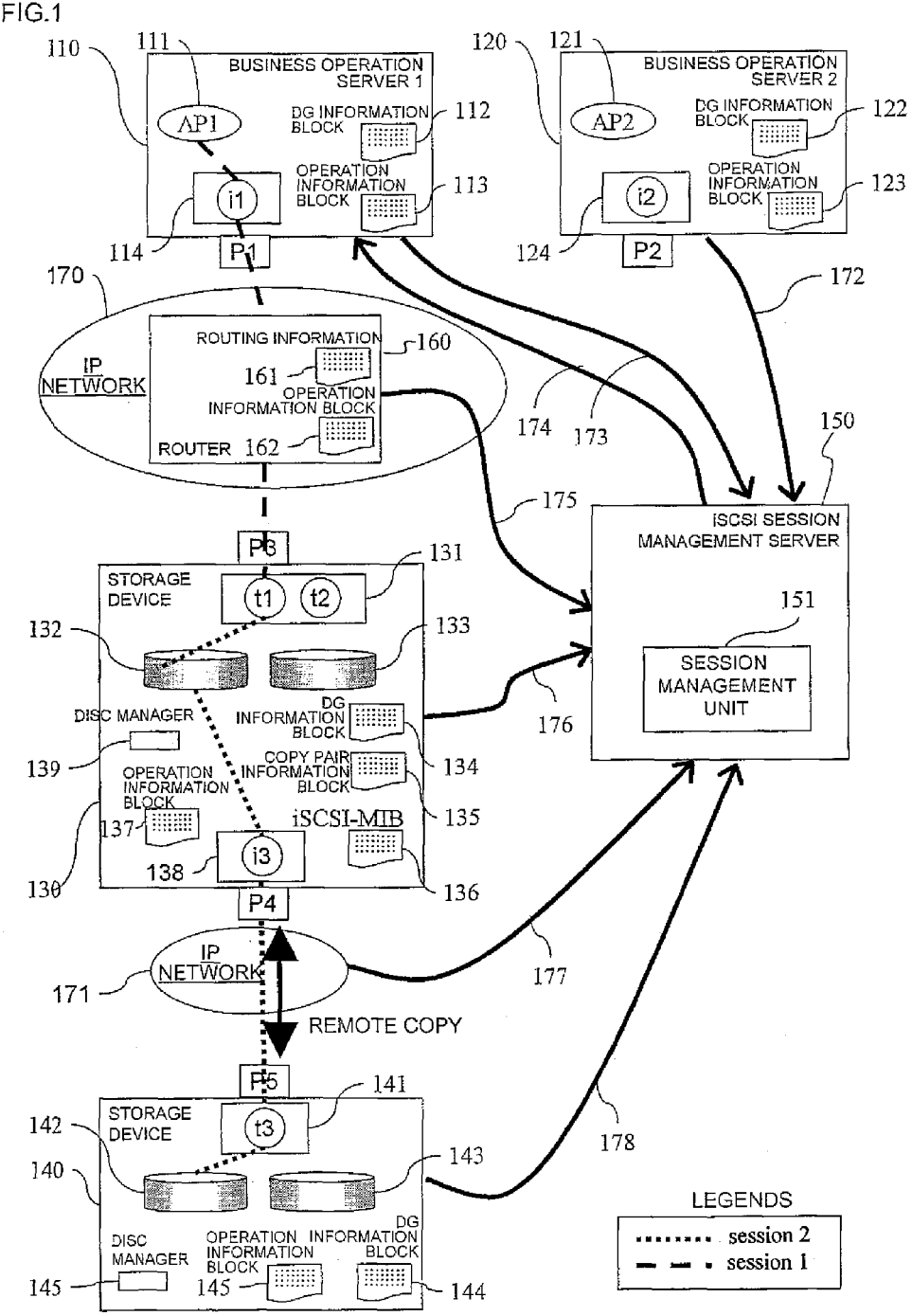
FIG. 1 is a system arrangement view of IP-SAN in an embodiment 1.

FIG. 1 shows a system arrangement of IP-SAN as the embodiment of the present invention. The embodiment has two iSCSI sessions shown by broken lines in the arrangement view. A first iSCSI session is an iSCSI session for realizing communication between an application AP1 on a business operation server 110 and a disc 132 on a primary storage device 130. The iSCSI session is created by an initiator i1, which is executed by an iSCSI driver 114 on the business operation server 110, between the initiator i1 and a target t1 through a port P1, an IP network 170, and a port P3. Hereinafter, the iSCSI session is abbreviated as "session 1" for the sake of convenience. In the embodiment, since the business operation servers 110 and 120 are used as user site servers, it can be said that the session 1 is a user access iSCSI session.

A second iSCSI session is a iSCSI session for realizing communication between the disc 132 on the primary storage device 130 and a disc 142 on a secondary storage device 140. The iSCSI session is created by an initiator i3, which is executed by a iSCSI driver 138 on the primary storage device 130, between the initiator i3 and a target t3 through a port P4, an IP network 171, and a port P5. Hereinafter, the iSCSI session is abbreviated as "session 2" for the sake of convenience. In the embodiment, since the primary storage device 130 and the secondary storage device 140 are in a remote-copy relation, it can be said that the session 2 is a remote copy iSCSI session.

In the embodiment, the business operation server 120 does not create any iSCSI session to any other devices. Further, the IP networks 170 and 171 may be networks different to each other or may be the same network. The business operation servers 110 and 120 may be act as servers in the present invention, and the primary and secondary storage devices 130 and 140 are examples of the storage devices of the present invention, and they correspond to information devices in the present invention.

The business operation servers 110 and 120 and the primary and secondary storage devices 130 and 140 hold default gateway information blocks 112, 122, 134, 144 that indicate that the default gateways thereof correspond to which IP addresses, respectively. A router 160 as one of the information devices of the present invention holds a routing information block 161 that defines a method of routing in a sub-net unit.

The primary storage device 130 holds a copy pair information block 135 that defines such specific matters that which disc of the device has a connection relation to which disc of the secondary storage device 140 and that when the disc has the connection relation, the disc is connected in which IP address using which port. Further, the primary storage device 130 holds the entire information of the iSCSI session flowing therethrough as iSCSI-MIB 136. iSCSI-MIB 136 is the information of the iSCSI session shown in the format of a management data base (hereinafter, abbreviated as MIB). The entire information of the iSCSI session is a path through which information passes and one of dynamic constitution information blocks in the present invention.

Further, the primary and secondary storage devices 130 and 140 have disc managers 139 and 145 that manage a correspondence relation as to which initiator uses which disc. On receiving a data acquisition requirement from a session management unit 151, the disc managers 139 and 145 sends the correspondence relation between the discs of the initiators to the session management unit 151 as a reply. The correspondence relation as the internal connection information held by the disc manager is one of the dynamic constitution information blocks of the present invention.

The respective information devices in IP-SAN hold the statuses such as whether they operate normally, whether a failure occurs therein, if the failure occurs, what king kind of a failure it is, where and when the failure occurred as operation information blocks 113, 123, 137, 145, and 162. These operation information blocks are one of subjects to be integrally managed by a storage session management server 150 to be described later likewise the constitution information blocks of the information devices.

The feature of the present invention is consolidated to the session management unit 151 of the iSCSI session management server 150. The iSCSI session management server 150 periodically collects the default gateway information blocks 112, 122, 134, 144, the routing information block 161, the copy pair information block 135, the iSCSI-MIB 136, and the operation information blocks 113, 123, 137, 145, and 162, and the operation information blocks 113, 123, 137, 145, and 162 from the respective information devices in IP-SAN using the session management unit 151 through an ordinary IP network or a dedicated management network by means of communication channels 172, 173, 175, 176, 177, and 178. Further, the respective information devices in IP-SAN issue a failure report showing the facts of failures occurred therein and the contents of the failures to the ISCSI session management server 150, and the iSCSI session management server 150 receives the failure report. The iSCSI session management server 150 detects the occurrence of failure based on the failure report and the information of an operation status and issues a failure notification 174 to a particular information device after a failure notification range is automatically narrowed down in the session management unit 151. This embodiment shows an example in which the failure notification 174 is issued by restricting the failure notification range only to the business operation server 110.

Figure 2:
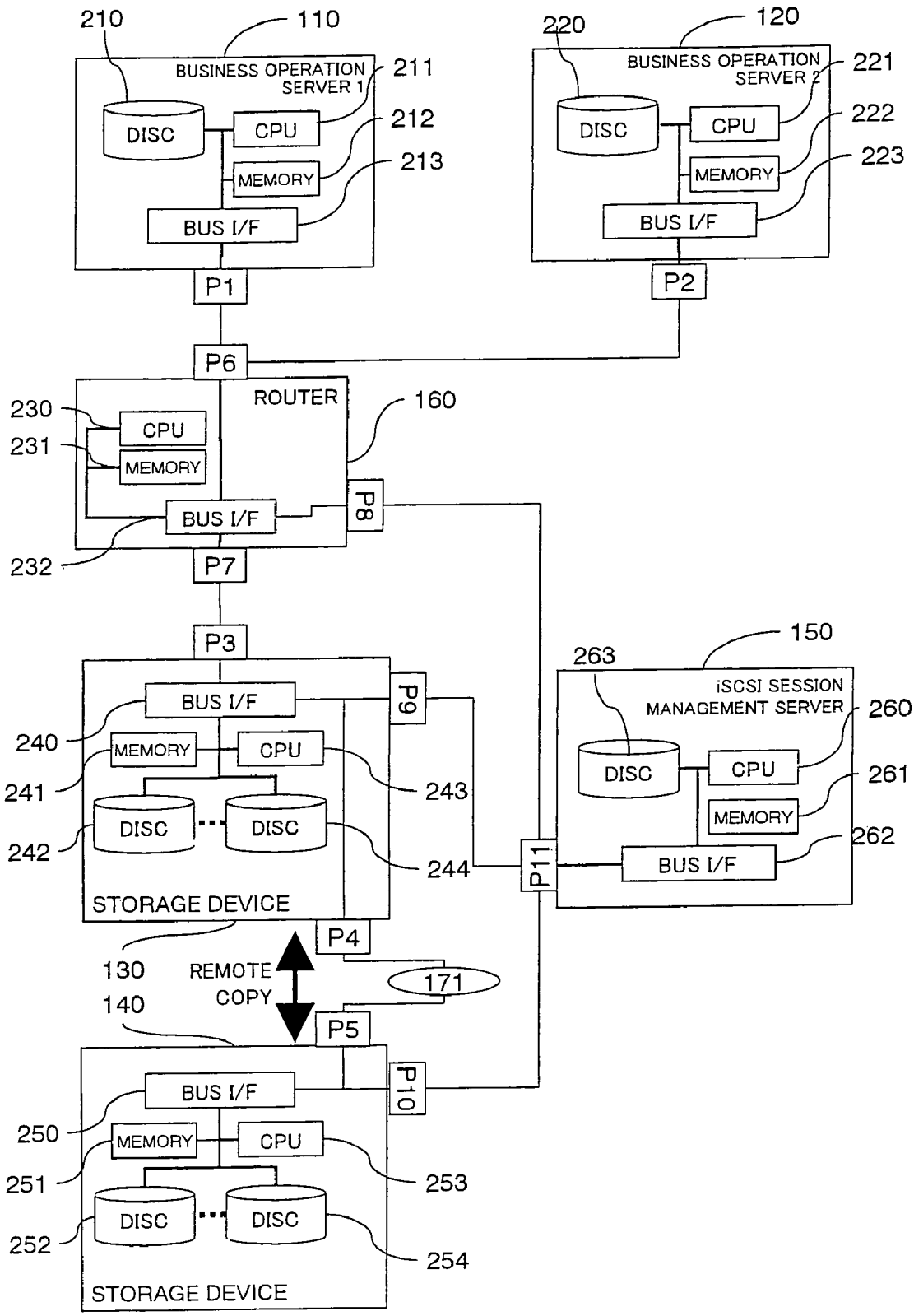
FIG. 2 is a physical arrangement view of IP-SAN in the embodiment 1.

FIG. 2 shows a physical arrangement, that is, a physical connection relation as one of static constitution information blocks that do not change in time in the embodiment shown in FIG. 1. The business operation servers 110 and 120, the primary and secondary storage devices 130 and 140, and the iSCSI session management server 150 have memories 212, 222, 241, 251, and 261 controlled by CPUs 211, 221, 243, 253, and 260 as well as one or more discs 210, 220, 242, 244, 252, and 254 and are connected to other devices through bus I/Fs 213, 223, 240, 250, and 262. Further, the router 160 has a CPU 230 and a memory 231 and is connected to other devices through a bus I/F 232.

The application AP1 has its entity on the disc 210 or the memory 212 of the business operation server 110. An application AP2 has its entity on the disc 220 or the memory 222 of the business operation server 120. Further, the initiator i1 used by the application AP1 has its entity on the iSCSI driver 114, and an initiator i2 used by the application AP2 has its entity on an iSCSI driver 124. The default gateway information block 112 and the operation information block 113 have their entities on the disc 210 of the business operation server 110 or on the memory 212. The default gateway information block 122 and the operation information block 123 have their entities on the disc 220 or the memory 222 of the business operation server 120. The routing information block 161 and the operation information block 122 have their entities on the memory 231 of the router 160. The default gateway information block 134, the copy pair information block 135, the iSCSI-MIB 136, and the operation information block have their entities on the discs 242 and 244 or the memory 241 of the primary storage device 130. Further, the default gateway information block 144 and the operation infromation block 145 have their entities on the discs 252 and 254 or the memory 251 of the secondary storage device 140.

The initiators i1 to i3 and the targets t1 to t3 may exist on the discs or the memories of the respective devices as software programs and their execution processes or may be exist on the TCP/IP offload engine (TOE) accelerator of a host path adaptor or a channel adaptor corresponding to iSCSI.

Figure 3:
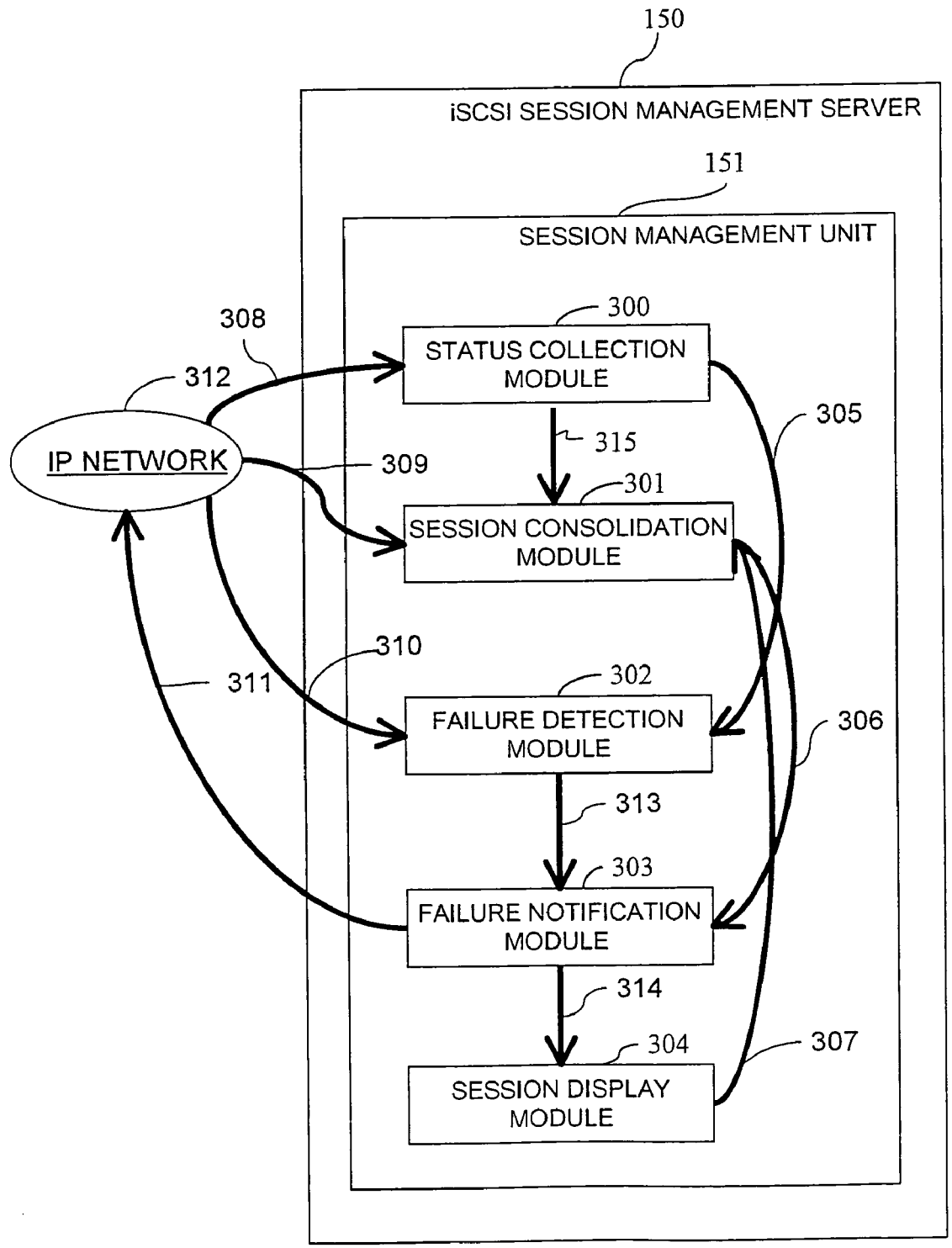
FIG. 3 is a module view of a session management unit.

FIG. 3 is a module view showing the session management unit 151 in detail. In the embodiment, although the session management unit 151 operates in the iSCSI session management server 150, the physical disposition of the session management unit 151 is not restricted as long as it can communicate with the respective information devices in IP-SAN. The session management unit 151 has five basic modules, that is, a status collection module 300, a session consolidation module 301, a failure detection module 302, a failure notification module 303, and a session display module 304. Note that the management range of the iSCSI session management unit 151 covers the entire IP-SAN area. The feature of each module will be described below.

The status collection module 300 shown in FIG. 3 is a module for managing whether or not the statuses of the respective information devices are normally maintained over the entire IP-SAN area. The status collection module 300 periodically collects the operation information blocks 113, 123, 137, 145, and 162 and the iSCSI-MIB 136 from the respective information devices through a communication channel 308 and automatically creates a status table shown in FIG. 4 by putting these information blocks in order for each information device. At the same time, the status collection module 300 automatically creates an iSCSI session table shown in FIG. 5 by putting these information blocks in order for each iSCSI session. The communication channel 308 includes the communication channels 172, 173, 175, 176, 177, and 178 in FIG. 1. The status collection module 300 sends a request to the respective information devices in IP-SAN to collect the operation statuses thereof at collection intervals whose value is previously set by a manager, and the status collection module 300 obtains the operation statuses from the respective information devices. When the collection intervals do not have the value previously set by the manager, they are set to a default value previously set in the information collection module. The format of the information of the operation statuses is not particularly restricted as long as the information is sufficient to determine whether the respective information devices are normally operated or whether they fail.

As shown in FIG. 4, the status table includes a device ID column, a type of status column showing a type of an operation status, and an operation status column for each information device. Any information may be applied as the information of the device ID column as long as an information device can be uniquely identified by the information, and the information may be an IP address, a host name, or a MAC address. A plurality of interface information blocks of a device ID are input to a port column of the type of status column. The interface information blocks mean the information of the IP address and the MAC address. Ordinarily, a rate of utilization of CPU, a load average of memory, an abandon ratio of packet, a syslog message, a simple network management protocol (SNMP) trap, and the like are often used as the information of the type of status column. The status collection module 300 automatically supplies the information indicting that whether an information device is normally operated or fails in the overall status thereof to the operation status column together with the statuses of the respective types of status. The operation status column may not indicate "failure" as the information thereof until failures occur in all of the rate of utilization of CPU, the interface, and the like. Otherwise, the operation status column may indicate "failure" even if a failure occurs in any of the types of status. The information of the type of status column is used to manage the performance and the failure of the respective information devices. For example, when a service level is managed, it can be determined that the performance of an information device is deteriorated when the level of performance thereof is deteriorated to a certain threshold value, and it can be determined that the information device fails when the level of performance thereof is further deteriorated. The information of the operation status column corresponds to the operation information of each information device. When operation information indicating failure is given to an information device, actions of notifying that a failure occurs, and the like are taken to the information device.

As shown in FIG. 5, the iSCSI session table includes seven columns, that is, the column of an iSCSI session ID, the columns of an initiator name and a target name constituting the session, the column of a disc number as an access destination of the iSCSI session, the column of a port through which the iSCSI session passes, the column of a collection time as a final time at which iSCSI session information is successively obtained (at which the session exists), and the column of a present status indicating whether or not the session remains alive as an active session at present. In the information shown in these columns, the information shown in the iSCSI session ID column is not restricted as long as it is information for uniquely identifying the session, and it may be portal information. Further, the port column holds the correspondence relation of a port through which the iSCSI session passes as a pair. The collection time column and the present status (active) column, which are the columns constituting the table, clearly shows that the iSCSI session is dynamic constitution information. When a present status is active, it is shown as "1", whereas when the present status is nonactive (including a case in which a switch is simply turned off and a case in which a failure occurs or occurred), it is shown as "0". Even if the session is nonactive, the information as to whether or not a device relating to the session fails is obtained by examining the operation status of the device as explained based on FIG. 4. The information of the present status corresponds to the operation information of each session in the present invention. The information shown in FIGS. 5 to 8 other than the operation information corresponds to the constitution information of the present invention.

Next, the status collection module 300 automatically creates a path table shown in FIG. 7 using the routing information block 161 and the default gateway information blocks 112, 122, 143, and 144 as base data. The path table shows logical path information in an IP layer and has the connecting relation of ports of each path by which each path is constituted. The path table includes a path column and a port column, the path column includes the serial numbers of paths automatically applied by the status collection module 300, and the port column includes information blocks shown in the sequence of ports connected to constitute the path. Further, a path 2 in FIG. 7 shows paths in the IP layer of a series of remote copies when it is assumed that the ports of the router existing in the IP network 171 are shown by Pn, Pm. The path table shown in FIG. 7 shows a logical connecting relation of the IP network and corresponds to the static constitution information of the present invention.

Further, the status collection module 300 collects the information showing the relation between the respective iSCSI sessions, that is, collects, in the embodiment, the copy pair information block 135 of the primary storage device at the above collection intervals. FIG. 6 shows an example of the collected copy pair information block 135. The copy pair information block is a table having a pair of the information block of a subject from which a copy is made and the information block of a subject to which the copy is made, each of the information blocks has an IP address column, a disc number column, and a port number column. It can be found from the copy pair table shown in FIG. 6 that the disc 132 in the primary storage device 130 having the IP address of a.b.c.1 acts as a primary volume, and the disc 142 in the secondary storage device 140 having the IP address of a.b.c.2 acts as a secondary volume, and they constructs a copy pair relation using the port P4 and P5. The processes described above are the processes executed by the status collection module 300.

Next, the session consolidation module 301 is a module for groping the information of the iSCSI session table automatically created by the status collection module 300 based on the category of each application for management and for consolidating the information of the iSCSI sessions. The status collection module 300 transmits the information of the iSCSI session table to the session consolidation module 301 through a communication channel 315. A method of grouping the information according to the category is, for example, a method of managing the access of each user. In this case, even if, for example, the respective iSCSI sessions in IP-SAN are a plurality of sessions separated as a remote copy session, a session for making a session virtual, an external storage session, and a storage pool session, the iSCSI sessions, which are established as a series of service presented to respective users, are grouped. The session information is consolidated and managed by grouping the session information, thereby the respective information blocks are integrally managed.

The grouping employed in the embodiment will be briefly explained. The session 1, which is an iSCSI session between the business operation server 110 and the primary storage device 130, is a session for accessing the primary storage device, and the session 2, which is an iSCSI session between the primary storage device 130 and the secondary storage device 140, is a session for remote copy. Although the sessions 1 and 2 are independent sessions, since they present a series of service to the users of the business operation server 110, they are grouped.

The session consolidation module 301 extracts a pair of disc numbers in each row of the copy pair table shown in FIG. 6, and an iSCSI session having the extracted disc numbers as the information of an access destination is searched from the iSCSI session table. As a result, the pair of sessions found from the iSCSI session table is added to each row of a service group table shown in FIG. 8 as a result of grouping of the sessions of each service.

The service group table shown in FIG. 8 comprises a service column, a user access column, and a copy pair column. When the status collection module 300 has an identifier such as a serial number or the like that is automatically given thereto by the session consolidation module 301 to uniquely discriminate a particular service or has information as to the application to which the service corresponds, the service column may be provided with an identifier for uniquely identifying the name of the application or the application. In the embodiment, when the iSCSI session table is created, it is assumed that only the correspondence relation that communication is executed through the session 1 using an application AP1 and the session 2 using an application 2 has been obtained as information set to the respective business operation servers or information set to the session management unit 151. Accordingly, the names of the applications (AP1 and AP2) are shown in the service column of the service group table of the embodiment. Further, the information of session ID for user access and the information of session ID for remote copy are shown in the user access column and the remote copy column of the service group table, respectively. Accordingly, it can be found that the service to the application AP1 as the series of service has the session of the user access session 1 and the session of the remote copy session 2. FIG. 8 shows the final information which the storage session management system intends to obtain, and the final information is the information of sessions that are necessary to minimize the number of notification destinations to which the occurrence if a failure is notified when it occurs. That is, since it is not necessary to check the applications which are not grouped because they have no relation, loads on the system and users are reduced when the occurrence of a failure is notified in a large scale system.

The consolidation process is finished once when all the disc pair information blocks in the copy pair table as shown in FIG. 6 is fetched. Next, the grouping process is executed when the contents of the operation status collected by the status collection module 300 is changed.

Regardless that a failure occurs or not, the status collection module 300 periodically issues a report of the operation statuses of the respective devices to the failure detection module 302. When the failure detection module 302 receives the failure report through a communication channel 310 or when a failure report is included in the operation status failure which the detection module 302 received from the status collection module 300 through a communication channel 305, the failure detection module 302 issues an instruction for prompting the execution of a failure notification to the failure notification module 303 through a communication channel 313.

When the failure report is included in the contents of the operation status report which the failure notification module 303 received from the status collection module 300 or when failure reports are spontaneously issued from the respective devices in an IP network 312, the failure notification module 303 issues a report that a failure was detected by the failure detection module 302 to the respective business operation servers through a communication channel 311 together with the information of the location of the failure, a time when the failure occurred, the contents of the failure, and the like as well as also notifies the session display module 304 of the failure through a communication channel 314. The information of the group of the iSCSI sessions, which is consolidated and processed by the session consolidation module 301, is previously notified to the failure notification module 303 through a communication channel 306 as shown in FIG. 3. Since the failure notification module 303 notifies necessary information devices of the failure based on the information of the group of the iSCSI sessions having been subjected to the consolidation process, the load on the network and the affect to the users can be minimized.

Figure 9:
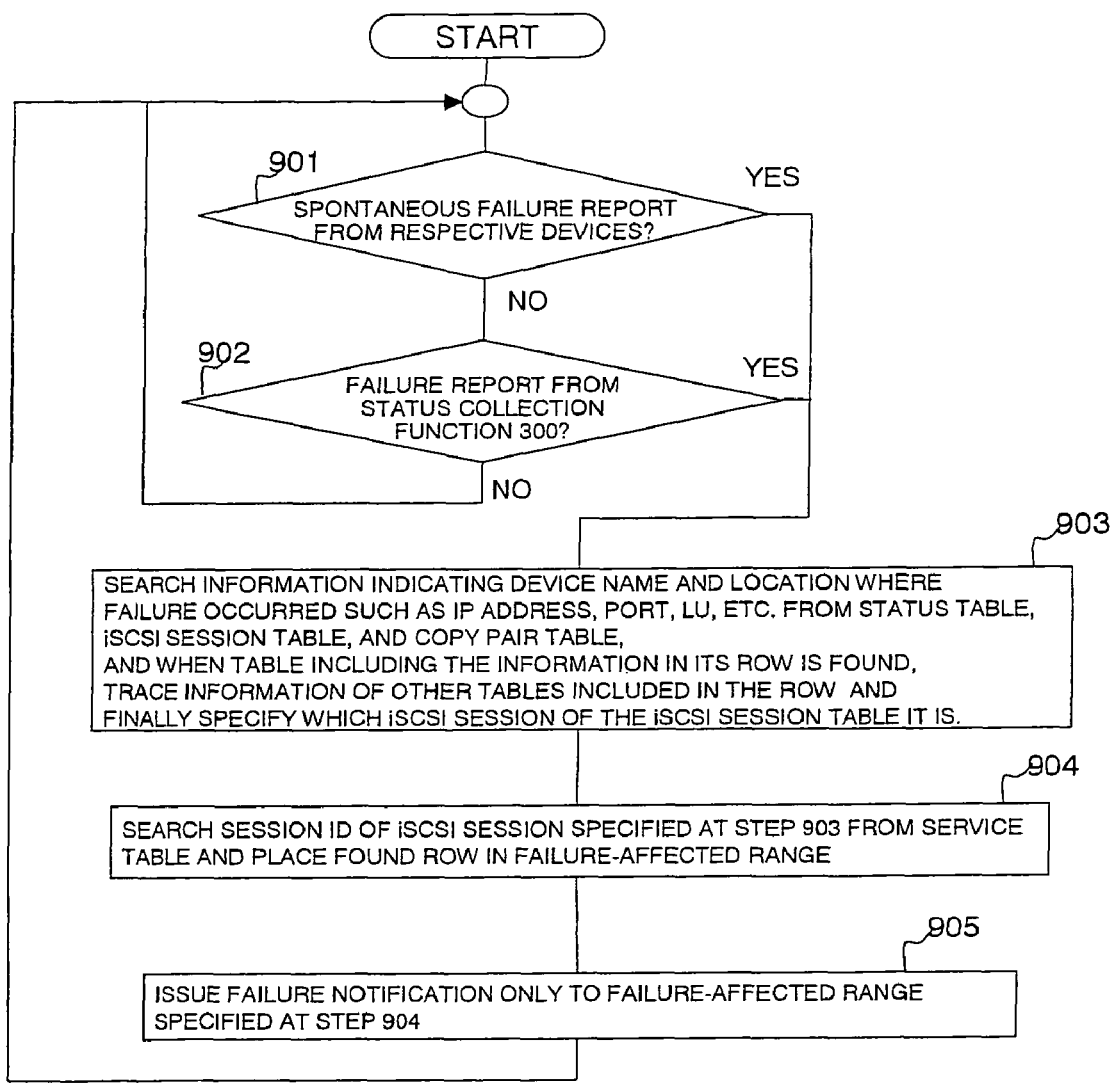
FIG. 9 is a view showing an example of a failure notification.

FIG. 9 is a flowchart showing an operation when a failure occurs. In the embodiment, a flow for notifying the failure will be briefly described assuming that the failure occurs in the disc 142 of the secondary storage device 140. In the embodiment, the failure of the disc is detected in the secondary storage device 140, and a failure report is spontaneously issued from the secondary storage device 140 to the session management unit 151.

At step 901 of FIG. 9, the failure detection module 302 determines whether or not there are spontaneous failure reports (although the failure reports are generally sent as a SNMP trap and a syslog message, the format thereof is not restricted) from the respective devices being monitored. When there is no failure report, the process goes to step 902, whereas when there is any failure report, the process goes to step 903. That is, at step 902, the failure detection module 302 determines whether or not a failure report is included in the contents of the report of the operation status from the status collection module 300. When the failure report is not included therein, the process returns to the loop in which the above steps are repeated, whereas when any failure report is included, the process goes to step 903. In the embodiment, since the failure detection module 302 receives the failure report spontaneously issued from the secondary storage device 140 to the session management unit 151, the process goes to step 903 from step 901.

At step 903, the failure detection module 302 searches the information indicating the name of the device and the location where the failure occurred such as an IP address, port number, disc number, and the like from the status table, the iSCSI session table and the copy pair table, and when the failure detection module 302 finds a table which includes the information in a row thereof, it traces the information of the other tables included in the row and finally specifies which iSCSI session of the iSCSI session table it is.

In the embodiment, since the information, which is included in the failure report and indicates the failure-occurring location, indicates the disc 142 of the secondary storage device 140 as the location, the failure detection module 302 finds a first row of the copy pair table as information relating to the failure. Next, the failure detection module 302 obtains the correspondence relation that the information of the found row is subjected to remote copy using the ports P4 and P5. When the iSCSI session table is searched based on the information, it is found that an iSCSI session called the session 2 and an iSCSI session called an iSCSI session 4 are sessions which make communication using the ports P4 and P5. Next, the failure detection module 302 determines whether or not the found ISCSI sessions are active sessions, and the session, which is not active at present invention, is eliminated from the range affected by the failure. Since the session 4 is not an active session here, it is eliminated from the range affected by the failure, and it is determined that only the session 1 is within the range affected by the failure.

Next, at step 904, the failure notification module 303 the row including the session 1 as the session ID of the iSCSI session specified at step 903 from the service group table and finds a service to the application AP1 for executing communication using the sessions 1 and 2.

Next, at step 905, the failure notification module 303 searches the devices corresponding to the sessions 1 and 2 that are within the affected range specified at step 904 from the iSCSI session table and issues the information of a failure notification table of FIG. 10 as a failure notification only to the business operation server 110 and the primary storage device 130, which are obtained as a result of the search, through the communication channel 311. Further, the failure notification module 303 issues the information of the failure notification table to the session display module 304 through the communication channel 314 to display failure information. Then, the process returns to the loop in which the above steps are repeated to prepare for the occurrence of a next failure.

At step 905, the failure notification module 303 automatically creates the contents of the failure notification as the failure notification table shown in FIG. 10. The failure notification table includes a target name column, an iSCSI session ID column, a failure location column, a time of failure occurrence column, and a failure content column, and the target name column described first is a column essential to issue the failure notification. However, the notification may be made only to the target t1 located at the tail end of the series of service or may be made to the primary storage device 130 in midstream at the same time. The session management unit 151 uses the contents of the created failure notification table to notify the respective devices of the failure and to display sessions.

Finally, the session display module 304 is a module for visualizing the information of the grouped iSCSI sessions. A feature of the session display module 304 resides in that it permeably displays the locations where the iSCSI sessions can be created, the locations where the iSCSI sessions are actually created, the information of a failure occurred in iSCSI sessions, the range affected by the failure, the information of the iSCSI session disappeared by the failure, and the like on a single screen. At the time, the information as to the failure is obtained from the failure notification module 303 through the communication channel 314 and displayed on the above screen. Further, the logic constitution information in the IP layer is superimposed on the information of the iSCSI sessions and displayed.

Figure 11:
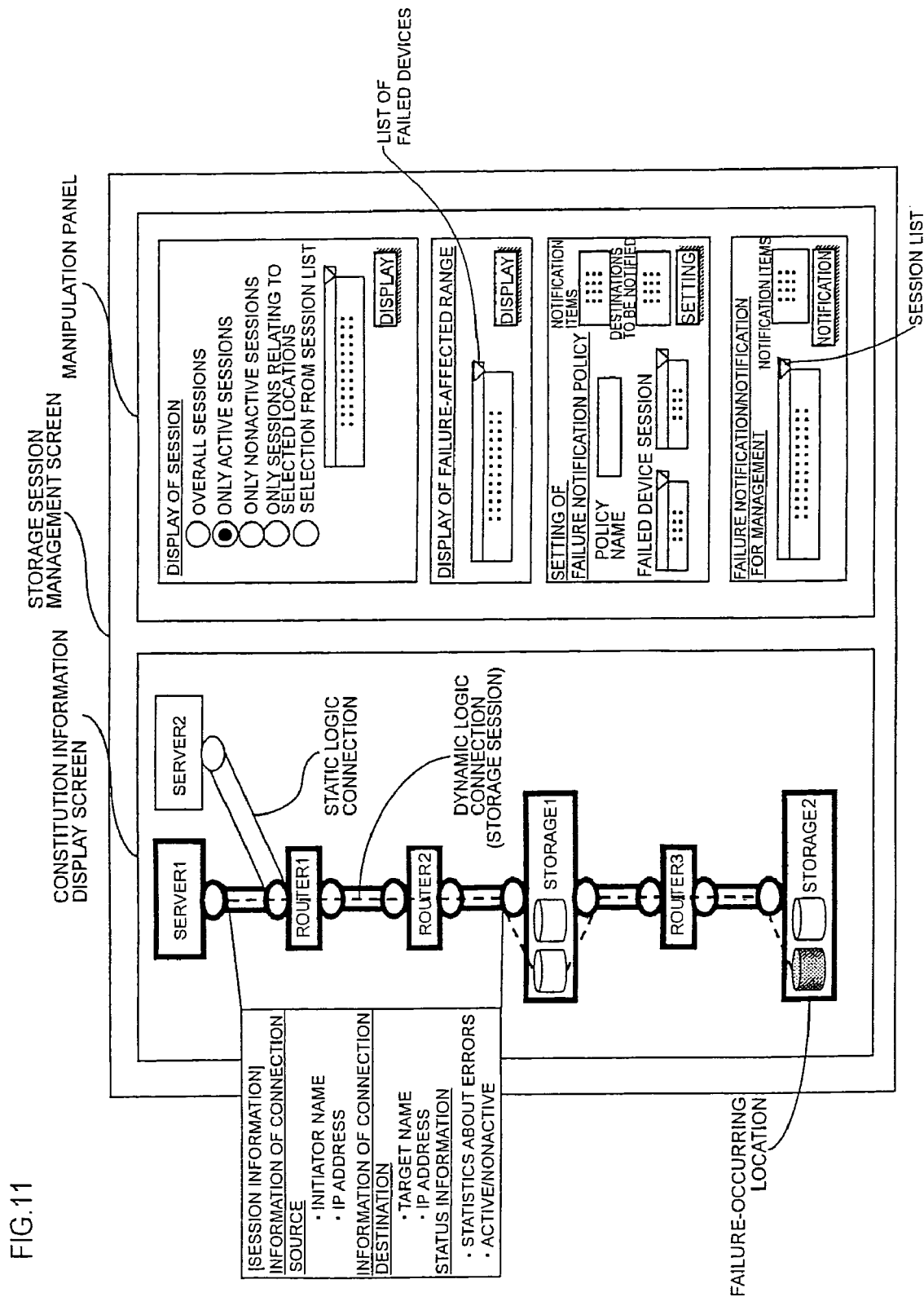
FIG. 11 is a view showing an example of a display screen displayed by a session display module.

Further, the display screen of the session display module 304 has an interface for updating a policy for creating the service group table, that is, the unit of a service group with the new policy input by the manager in the consolidating process of the iSCSI sessions executed by the session consolidation module 301, and a result of the update is automatically reflected to the session consolidation module 301 through a communication channel 307 in FIG. 3. FIG. 11 shows an example of the display screen. That is, the manager, who gets a look at the display screen in the session display module 304 can feed back a module for grouping and consolidating the information of the sessions of the session consolidation module 301 based on the category of each application for management.

The display screen shown in FIG. 11 is an example of a storage session management screen, and a constitution information screen is displayed on the left half of the screen, and a manipulation panel screen is displayed on the right half of the screen. The constitution information display screen is a screen corresponding to the bone structure of the system arrangement view of IP-SAN shown in FIG. 1 and shows a dynamic logic connection (storage session) together with a static logic connection. The figure shows that one of the discs of a storage 2 fails. Further, it is also preferable to visualize the range of the other devices, which are affected by the deterioration of performance being occurred, in addition to the range, in which a failure just occurs, by narrowing down the devices whose performance is deteriorated or the storage sessions or each storage session group to which the devices belong and displaying or not displaying them (displaying them in emphasized font or in non-emphasized font) by making use of not only the performance information of the devices or the sessions in which a failure occurs but also the performance information of each device included in operation information. The operation information of the devices included in the storage session is displayed on the screen in the form of a list and the like. In the selection of the sessions, the respective sessions may be selected in each unit or the overall group of the sessions may be selected. It is preferable to deploy attribution information by selecting the respective sessions and by, for example, double clicking them. As to the session from a server 1 to a storage 1, the information of a connection source including an initiator name and its IP address, the information of a connection destination including a target name and its IP address, and status information as to error statistics and active/non-active statuses can be displayed as session information. It is preferable to display only the session of a further selected device or the session relating to the components in the device with a click on a constitution information display screen. When a session group is selected, the attribution information of all the sessions belonging to the session group can also be deployed by the same manipulation.

A manipulation panel configures a session display panel for selecting a session to be displayed on the constitution information display screen, a failure-affected range display panel that can display a list of failed devices and the failures which can be selected and designated from the list, a failure notification policy set panel having buttons that can set a failure notification policy including the items of a failed device name, a session name, items to be notified, and a notifying destination, and a failure notification/notification for management panel for designating a list of sessions and items to be notified and instructing to notify them. In the session display panel, a session of a type selected by a radio button is displayed on the constitution information display screen in emphasis font. When all the sessions are selected, all the active/non-active sessions are displayed. However, it is preferable to display them in different emphasis font so that how they are different from each other can be discriminated. It is possible to display the sessions after they are narrowed down by selecting the active and non-active sessions. Further, it is also possible to select one or more arbitrary sessions from the session list and to display them. Two display methods can be selected as a mode to be taken when a display button is depressed. In one method, the sessions on the constitution information display screen are entirely displayed or are not displayed at all, and in the other method, all the sessions are displayed in any one of emphasis font and non-emphasis font. In the failure-affected range display panel, only one or more specific devices can be narrowed down from the list of the failed devices and displayed. The action to be taken when the display button is depressed is the same as that in the session display panel. In the failure notification policy set panel, a setting button is depressed after the above respective items are designated. When the set items are set as default values, the same contents of the set items can be used in subsequent operations. In the failure notification/notification for management panel, when a failure notification button is depressed at arbitrary timing, a failure notification can be issued regardless of presence or absence of failure. Although the notification is executed in the unit of a session, a notification destination may be designated in the unit of a device likewise the failure notification policy set panel.

When a failure occurs in the conventional IP-SAN, a failure notification is issued to all the business operation servers having a static connection relation regardless of the dynamic connection relation thereof. However, according to the present invention, even if a failure occurs in any section of IP-SAN, the range, which is predicted to be actually affected by the failure as a group or as a time passes, is automatically determined by the series of processes, and the failure notification is issued only to the range. Since such a countermeasure is taken against the failure as described above, it can be prevented that the range to which the failure notification is issued is unintentionally increased regardless of the scale of a network, which is advantageous in that the affect of the failure to the users and the servers can be minimized.

What is claimed is:

1. A computer system comprising a business server using data, a plurality of first storage systems connected to the business server and each having a first disk drive to store data accessed by the business server, a plurality of second storage systems connected to the first storage systems and each including a second disk drive to store copy data wherein the first and second storage systems are configured to operate to create remote copies of the data stored in the first disk drives and to store the remote copies as copy data in the second disk drives, and a management server;

the management server comprising:

a processor to control managing the first and the second storage systems; and a memory to store constitution information including session information regarding sessions of the business server and the first and the second storage systems, copy pair information indicating copy pairs which are each comprised of one of said first disk drives and one of said second disk drives, and port information indicating ports of said first and second storage systems which form paths between said first and second storage systems, wherein the processor manages a first session of user access from the business server to one of the first disk drives in the first storage system and a second session of the remote copy operation corresponding to one of the copy pairs of one of the first disk drives and one of the second disk drives as a group session comprised of the first and second sessions related to a same user application, based on the constitution information, wherein the first and second sessions are independent of one another but are grouped as the group session to present a series of services to users of the business server, wherein the processor collects operation information for all of the first and second storage systems, including information as to which ones of the first and second sessions are active or inactive, and creates display information, in which the operation information is only shown for ones of first and second storage systems corresponding to ones of the group sessions for which performance of at least one of the first and second storage systems or the first and/or second sessions corresponding to the group session are determined to be deteriorated and which group sessions are also determined, from the operation information, to include at least one of the first or second sessions which is active.

2. The computer system according to claim 1, wherein the display information includes a session ID and at least one of a failure occurring location, a failure occurring time and failure contents.

3. The computer system according to claim 1, wherein the constitution information includes a server group table including a service column, listing applications of the business server, a user access column, relating sessions to the listed applications for user access, and a copy pair column relating sessions to the applications for remote copying.

4. The computer system according to claim 1, wherein the constitution information includes a copy pair table including copy service information and copy destination information.

5. A computer The computer system according to claim 4, wherein the copy source information and copy destination information include at least one of device ID, IP address, disk number and port number.

6. The computer system according to claim 1, wherein the display information includes session information including information of a connection source, information of a connection destination and status regarding errors.

7. The computer system according to claim 1, wherein group sessions determined to be deteriorated are failed group sessions.

8. A computer system comprising a business server using data, a plurality of first storage systems connected to the business server and each having a first disk drive to store data accessed by the business server, a plurality of second storage systems connected to the first storage systems and each including a second disk drive to store copy data wherein the first and second storage systems are configured to operate to create remote copies of the data stored in the first disk drives and to store the remote copies as copy data in the second disk drives, and a management server;

the management server comprising:

a processor to control managing the first and the second storage systems; and a memory to store constitution information including session information regarding sessions of the business server and the first and the second storage systems, copy pair information indicating copy pairs which are each comprised of one of said first disk drives and one of said second disk drives, and port information indicating ports of said first and second storage systems which form paths between said first and second storage systems, wherein the processor manages a first session of user access from the business server to one of the first disk drives in the first storage system and a second session of the remote copy operation corresponding to one of the copy pairs of one of the first disk drives and one of the second disk drives as a group session comprised of the first and second sessions related to a same user application, based on the constitution information, wherein the first and second sessions are independent of one another but are grouped as the group session to present a series of services to users of the business server, wherein the processor collects operation information for all of the first and second storage systems, including information as to which ones of the first and second sessions are active or inactive, and creates display information, in which the operation information is only shown for ones of first and second storage systems corresponding to ones of the group sessions for which performance of at least one of the first and second storage systems or the first and/or second sessions corresponding to the group session are determined to be deteriorated and which group sessions are also determined, from the operation information, to include at least one of the first or second sessions which is active, and wherein the first and second sessions each include a session from a group including a remote copy session, a session for making a session virtual, an external storage session, and a storage pool session.

* * * * *